No. 646,778. Patented Apr. 3, 1900.
E. WINKLER.
MILK SEPARATING APPARATUS WITH SIPHON ARRANGEMENT.
(Application filed Nov. 9, 1899.)
(No Model.)

Witnesses:

Inventor
Edmund Winkler
By James L. Norris
Atty

United States Patent Office.

EDMUND WINKLER, OF ORLAMÜNDE, GERMANY.

MILK-SEPARATING APPARATUS WITH SIPHON ARRANGEMENT.

SPECIFICATION forming part of Letters Patent No. 646,778, dated April 3, 1900.

Application filed November 9, 1899. Serial No. 736,416. (No model.)

*To all whom it may concern:*

Be it known that I, EDMUND WINKLER, tinsmith, a subject of the Duke of Saxe-Altenburg, residing at Orlamünde, in the Duchy of Saxe-Altenburg, German Empire, have invented certain new and useful Improvements in Milk-Separating Apparatus with Siphon Arrangement, of which the following is a specification.

My invention relates to a milk-separating apparatus in which the separation is effected by draining off the skim-milk by means of a siphon which reaches down to the bottom of the vessel on one side until the cream only remains in the vessel.

Figure 1:
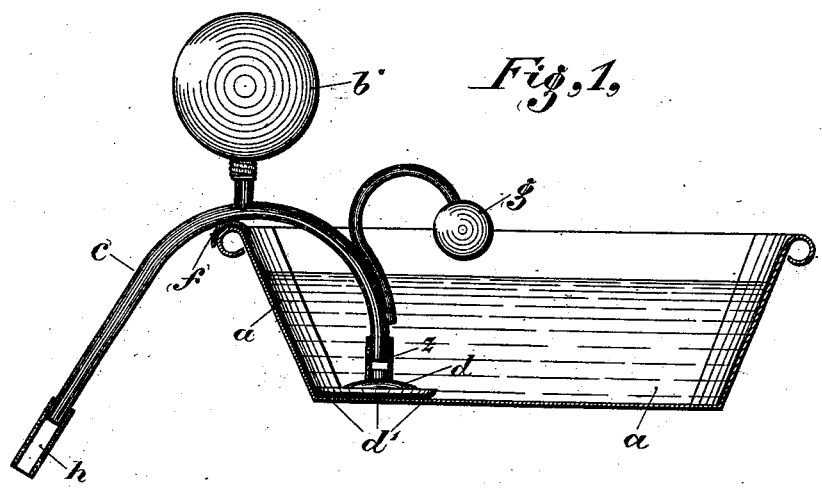
Figure 2:
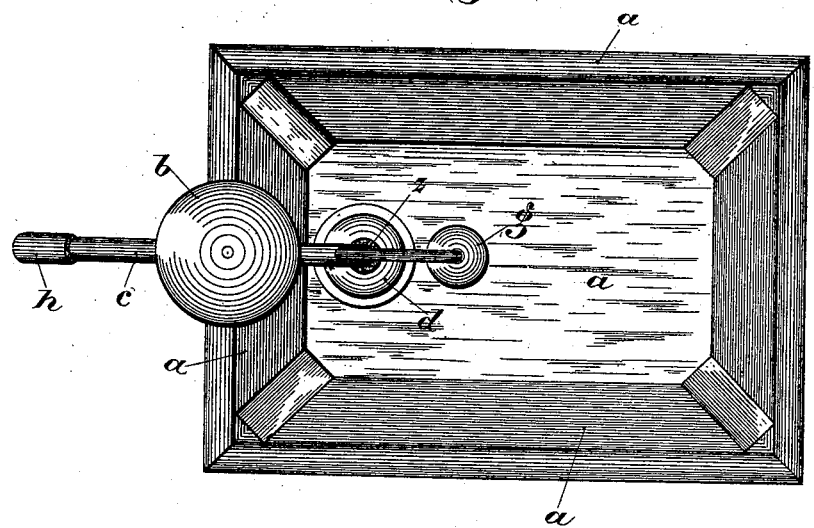

In the annexed drawings such a milk-separating apparatus with siphon discharge is illustrated in one form of execution, shown by way of example only, Figure 1 being a longitudinal section and Fig. 2 a plan.

The apparatus consists of a flat vessel $a$, without any discharge-orifice, and into which, in order to draw off the skim-milk, a suction-siphon $c$, provided with an india-rubber bulb $b$, is inserted.

In order to retain the siphon $c$ in position in the vessel $a$, it is provided with a foot-plate $d$, a counterpoise-weight $g$, which at the same time serves as a handle, and a grooved support $f$, which is placed over the edge of the vessel. The foot-plate $d$, which is attached, so that it can readily be exchanged, by means of a short piece of flexible tube $z$ to the siphon-pipe $c$, is provided with several downward projections $d'$, stamped out on the plate, and by means of which this foot-plate $d$ rests on the bottom of the vessel, so as to permit the milk to enter the siphon-pipe freely, while nevertheless the orifice is brought as near as possible to the bottom of the vessel.

In order to use the siphon, the rubber bulb $b$ is compressed, while at the same time the short piece of flexible tube $h$, attached to the discharge end of the siphon-tube, is firmly compressed with the hand, so as to close it hermetically. By the compression of the rubber bulb $b$ the air contained in the bulb is expelled through the milk and on releasing the bulb $b$ milk is drawn into it, and on releasing and thus reopening the flexible tube at the discharge end $h$ the milk will run off with a continuous and fairly-rapid flow into a vessel placed under the discharge-orifice, while the cream collected at the surface of the milk is left behind in the vessel $a$. The flow of the milk can be stopped at any moment by compressing the bulb $b$.

The siphon can be cleaned by sucking water into it and reëjecting it by alternately compressing and releasing the bulb.

The vessel $a$ is provided with a cover (not shown in the drawings) of fine wire-gauze which will not in any way prevent ventilation and the collection of cream, while, on the other hand, it will entirely prevent pollution of the milk by flies, vermin, dirt, &c., dropping into it.

Having now particularly described and ascertained the nature of my said invention and in what manner the same is to be performed, I declare that what I claim is—

1. An apparatus for separating milk from cream which has risen from said milk, consisting of a foot-plate provided with a short tube rising from it, a curved siphon-tube having its shorter branch connected to the tube on the foot-plate, a compressible bulb communicating with the siphon-tube and a grooved support on the lower side of said tube to engage the edge of the milk vessel, substantially as described.

2. In an apparatus for separating milk from risen cream, the combination with a curved siphon-tube of a foot-plate having a short tube rising centrally from it to engage the end of the shorter branch of said siphon-tube, a compressible bulb communicating with the latter, and a weight secured to said shorter branch by a curved, rigid arm, substantially as described.

3. In an apparatus for separating milk from risen cream, the combination with a siphon-tube, of a foot-plate having a short tube rising from it to engage the short branch of the siphon-tube and provided with downward projections on its lower face, a compressible bulb communicating with the siphon-tube, a grooved support on the latter to engage the edge of the milk vessel, and a weight connected to said tube by a curved arm, substantially as described.

In testimony whereof I have hereunto set my hand in presence of two subscribing witnesses.

EDMUND WINKLER.

Witnesses:
PAUL TEICHMANN,
LINA HARZ.